March 11, 1969  C. C. BELL  3,431,719
APPARATUS FOR PROCESSING YARN
Filed July 26, 1967  Sheet 1 of 6

INVENTOR
CHARLES C. BELL
BY
ATTORNEYS

INVENTOR
CHARLES C. BELL
ATTORNEYS

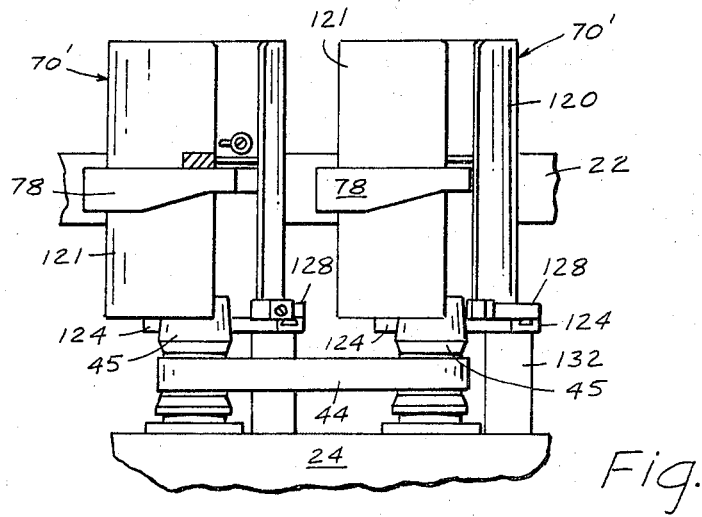
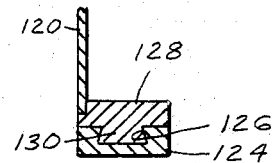
Fig. 7
Fig. 9
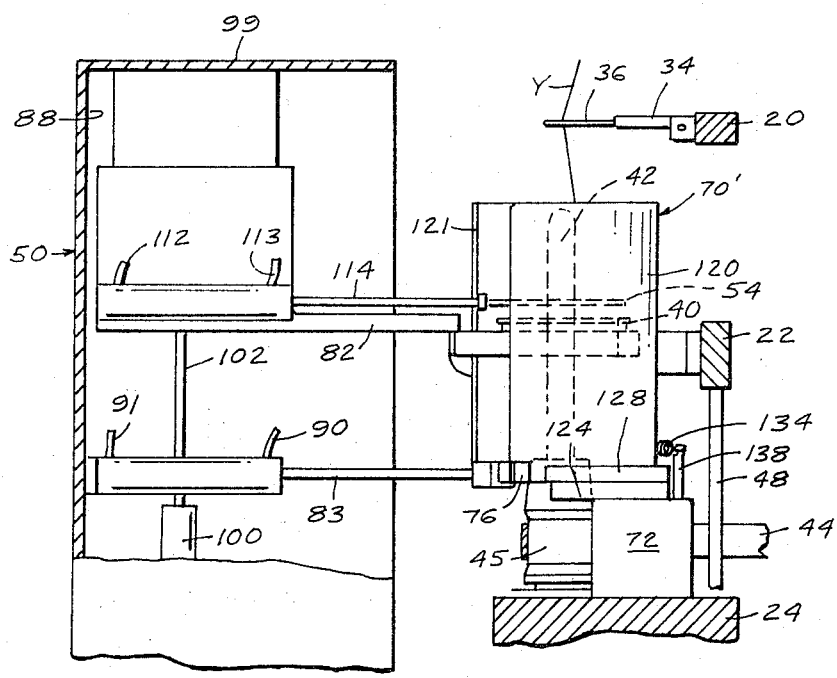
Fig. 8
INVENTOR
CHARLES C. BELL
BY
Albert P. Davis
Burnett W. Norton
ATTORNEYS

INVENTOR
CHARLES C. BELL
BY
ATTORNEYS

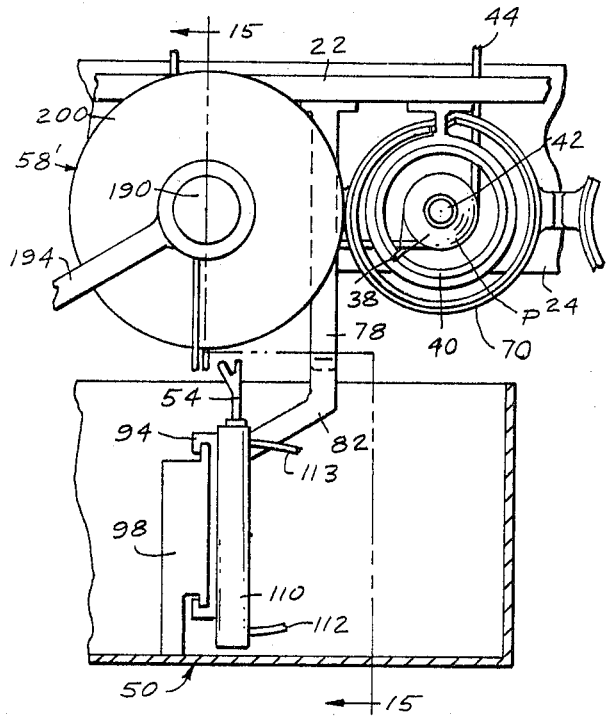
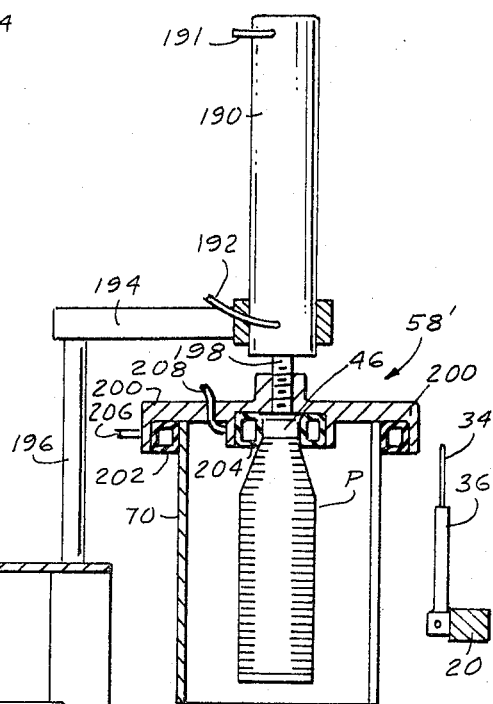
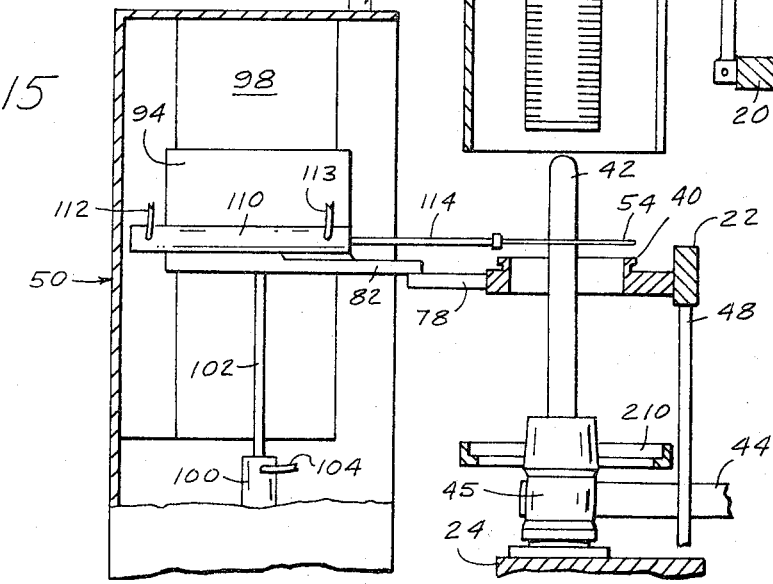
Fig. 14
Fig. 15
INVENTOR
CHARLES C. BELL
ATTORNEYS United States Patent Office 3,431,719
Patented Mar. 11, 1969

3,431,719
APPARATUS FOR PROCESSING YARN
Charles C. Bell, Warwick, R.I., assignor to Leesona Corporation, Warwick, R.I., a corporation of Massachusetts
Filed July 26, 1967, Ser. No. 656,158
U.S. Cl. 57—108       36 Claims
Int. Cl. D01h 13/04, 7/52, 13/26

ABSTRACT OF THE DISCLOSURE

Apparatus for controlling ballooning of yarn being twisted and wound on a textile machine having ring and traveler means. The take-up package is surrounded by a tube which is operative to permit servicing of the yarn traveler within said tube. Alternately, the tube may be removed automatically to expose the traveler for servicing, or the ring and traveler may be automatically displaced beyond the confines of the tube for servicing.

Background of the invention

The present invention relates to the field of yarn processing and is concerned more particularly with method and apparatus for processing staple fibers into yarn on a ring spinning machine, or yarn twisting machine or the like, and collecting the spun and twisted yarn within the confines of a tube or similar restricted zone.

In common textile parlance "spinning" is understood to mean the generally simultaneous or continuous process wherein roving, i.e., staple fibers, are drafted, twisted and wound up, and such definition will be applicable where spinning is referred to herein. Moreover, while the instant invention is shown and described in connection with a spinning machine, it will be evident that said invention will be equally applicable to other types of textile machines such as twisting machines, plying machines and the like where a ring and traveler system are used to process yarn.

In spinning operations carried out on a ring spinning machine it is usual to reduce the staple fiber strand or "roving" to the required diameter of single yarn by means of a drafting system, to insert the desired number of turns of twist into the strand after it has been reduced to the required diameter to thereby transform the drafted strand into yarn, and finally to wind the yarn into a suitable package for further use. The twisting is accomplished by a removable spindle and traveler. The spindle on which the take-up package is supported revolves at high speed and carries the yarn end with it. The yarn is threaded through the traveler and causes the traveler to revolve at high speed on the circular raceway of a ring. As a result of these revolutions the strandular material is twisted as it flows to the take-up package.

As the material is twisted by the conventional procedure just described it forms an enlarged balloon about the take-up bobbin. It has been recognized that, due to the power drag on the yarn balloon, the balloon adds to the power requirements for spinning yarn, create abnormal tension conditions in the yarn being twisted, and contribute to strand breakage during spinning. This air drag also requires the use of a relatively heavy traveler in order to prevent balloon collapse, or "double ballooning" which causes end breakage. Such heavy travelers only serve to compound the problems just mentioned. In an effort to control this ballooning it has previously been proposed to use balloon control rings, flat sheet metal balloon separators and variously configured wire members to restrict the size of the balloons. These procedures are only partially effective in reducing the aforementioned disadvantages of ballooning during yarn spinning since, by their very nature, they leave some portion of the balloon unconfined.

Summary of the invention

The present invention is directed to high novel and improved method and apparatus capable of spinning yarn while confining the balloon formed during the spinning operation to a restricted zone over its full dimension. By such balloon confinement the present invention leads to production of yarns at higher speeds than has heretofore been possible and, also, permits yarn spinning with less power consumption than has previously been possible. Furthermore, the present invention advantageously leads to less strand breaking during spinning and twisting of yarn, superior control of strand ends when a break does occur, and contributes to a relatively lint-free spinning machine.

Objects of the invention

Consistent with the foregoing it is one object of the present invention to provide apparatus for spinning yarn and winding up the spun yarn within a confined zone.

Another object of the present invention is to provide apparatus operable to permit twisting and winding up of yarn on a bobbin within a confined zone and to afford easy removal of the wound bobbin by automatic means from the confined zone.

A further object of the present invention is to provide, in conjunction with a spinning machine having ring and traveler means for inserting twist into yarn, a tube for generally enclosing the ring and traveler to thereby confine the balloon generated by operation of said traveler.

Another object of the present invention is to provide a spinning machine having a tube generally enclosing the ring and traveler and the take-up spindle of said spinning machine, and including means for manipulating said tube to permit threading of a strand of yarn through said traveler.

Still another object of the invention is to provide a spinning machine having a tube generally enclosing the ring and traveler and the take-up spindle of said machine, and including means for shifting said ring and traveler out of the effective zone of said tube for threading.

Other objects of the invention will in part be obvious and will in part appear hereinafter.

Description of the drawing

For a fuller understanding of the nature and objects of the invention, reference should be had to the following detailed description taken in connection with the accompanying drawing wherein:

FIG. 7 is a view taken along lines 7—7 of FIG. 6;

FIG. 8 is a view taken along lines 8—8 of FIG. 6;

FIG. 9 is a view taken along lines 9—9 of FIG. 6;

FIG. 14 is a plan view of still another modification of the invention;
and
FIG. 15 is a view taken along lines 15—15 of FIG. 14.

*General description*

Figure 1:
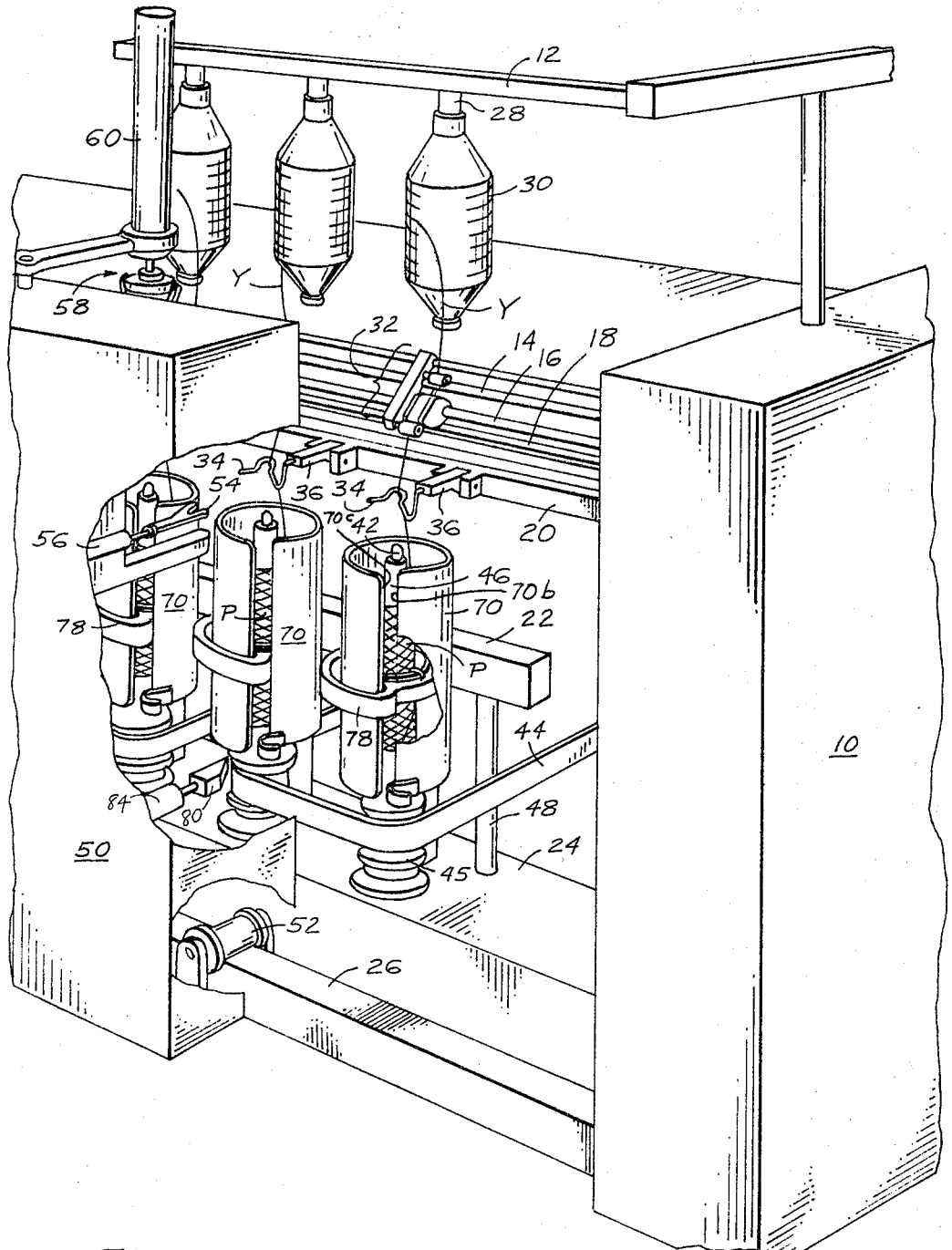
FIG. 1 is a perspective view of a portion of a textile spinning machine incorporating the present invention, the spinning machine being provided with automatic tending mechanism of the type fully disclosed in commonly assigned United States patent application Ser. No. 534,081 of Mar. 14, 1966, certain parts of the tending mechanism being broken away for clarity.

Except as noted hereinafter, the spinning machine employed in accordance with the present invention may be of conventional construction and operation. In view of this and in the interests of conciseness and clarity, only so much of the details of the conventional portions of the spinning machine will be described herein as is required to a complete understanding of the instant invention. Thus, with reference initially to FIG. 1 it is seen that the spinning machine includes a fixed frame constituted as a plurality of vertical supports one of which is shown at 10 and a number of horizontally disposed members carried on the supports 10 and extending the full length of the machine. Among these horizontal members are a creel 12, a plurality of positively driven shafts 14, 16, and 18, a yarn guide rail 20, a ring rail 22, a spindle rail 24 and a relatively heavy base rail 26. The creel 12 is provided with a plurality of spaced, depending roving bobbin holders 28 each of which serves as a mount for a roving bobbin 30. The driven shafts 14, 16 and 18 are cooperative with a drafting roll unit 32 at each spinning position to draft the roving Y flowing from a one of the bobbins 30. At each spinning position along the machine there is provided a yarn guide 34 carried on a pivotable bracket 36 supported on rail 20. The yarn issuing from the drafting roll unit 32 is thus directed by the yarn guide 34 to a traveler 38 positioned to revolve on a ring 40 which is disposed circumferentially around a spindle 42 at each winding position along the spinning machine. Thus, as each winding spindle 42 which is mounted for rotation at each spinning position is rotated, as by driven belt 44 engaging a whorl 45 on each spindle, and with the end of yarn Y attached thereto, the traveler 38 is caused to revolve on the circular raceway provided by ring 40 in consequence of which the yarn Y is twisted and wound up a package core 46 secured on spindle 42 after the yarn has been drafted. Elongated ring rail 22 which is common to all the winding positions along a side of the spinning machine is traversed to and fro axially of the several spindles 42 and package cores 46 on said machine side by conventional traversing means not herein illustrated which operate said ring rail through a plurality of spaced reciprocating members, one of which is shown at 48. In consequence of this traversing motion the yarn flowing through traveler 38 is distributed along the length of each core 46 to wind a respective package P.

The spinning machine may be advantageously equipped with a patrolling tender of the type fully disclosed in Bell and Niederer United States patent application Ser. No. 534,081 filed Mar. 14, 1966. Therefore, again here, in the interests of conciseness and clarity only so much of the details of said patrolling tender will be described herein as is necessary to a fuller understanding of the instant invention. Thus, the tender 50 includes carriage means (not illustrated) which are movable on rollers, one of which is shown at 52, along base rail 26 by power means not shown herein. The tender is responsive to a missing strand of yarn or full bobbin at any spinning position along the length of the machine to stop at said position and service the yarn at the position to thereby reinstitute the spinning, twisting, winding cycle all as fully described in the aforecited patent application. In the operation of the tender during servicing of the yarn a threader fork 54, schematically shown in FIG. 2, operable by an air cylinder 56 engages the yarn and positions it for engagement with the traveler. As a further feature of tender 50 when the roving Y breaks or becomes exhausted at any spinning position, or when package P attains its full size, bobbin transporting mechanism 58 is operable through air cylinder 60 carried on tender 50 to doff package P and core 46 and, subsequently, to return the same core or a fresh core on spindle 42 as steps in reinstituting the spinning, twisting and winding cycle.

Figure 2:
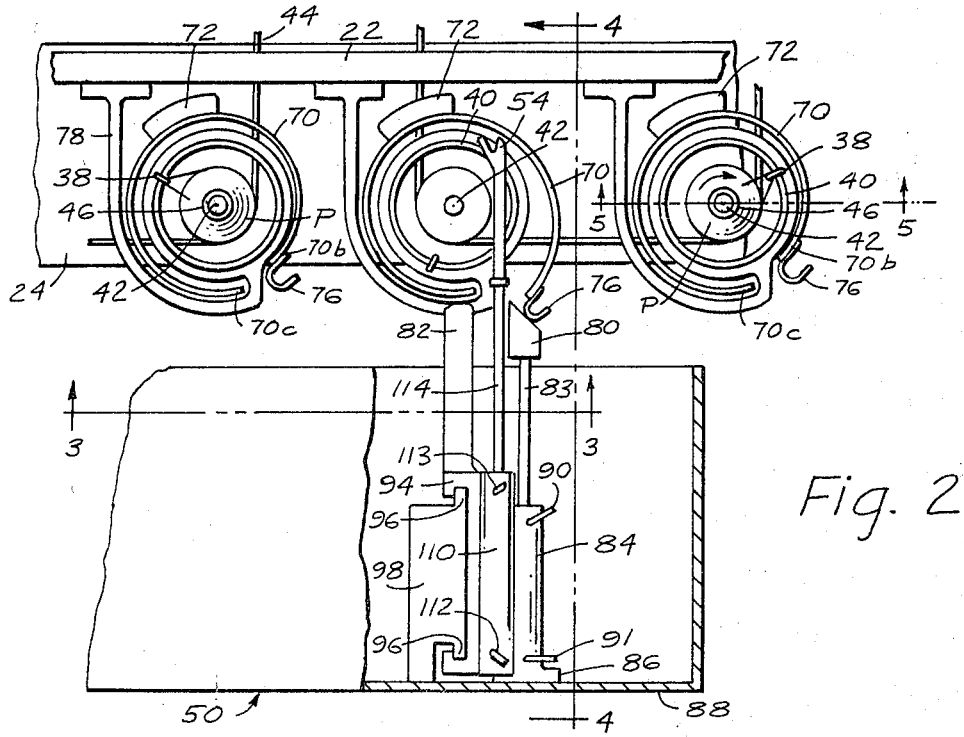
FIG. 2 is a plan view of a portion of the spinning machine and tending mechanism shown in FIG. 1.
Figure 3:
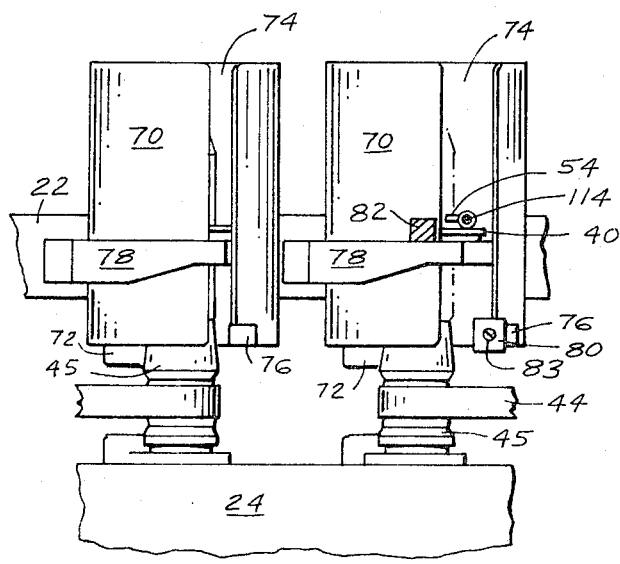
FIG. 3 is a view taken along lines 3—3 of FIG. 2.

With attention now to FIG. 1–5 it is seen that the take-up station of each winding position along the length of the spinning machine is generally enclosed by an elongated, flexible sleeve or tube 70, which extends for at least the full effective traversal distance of ring 40 axially of core 46 and, desirably, extends the full length of spindle 42 from a point where the lowermost end of core 46 seats thereon to the upper terminus of said spindle. In this manner, the entire balloon generated around spindle 42 and core 46 is restricted by said tube 70. In order that the yarn balloon may be closely confined each tube 70 has an internal diameter only slightly larger than the diameter of the circle of movement of traveler 38 on ring 40. In this manner traveler 38 is free to revolve on its respective ring 40, but the resultant yarn balloon generated thereby is rather tightly confined. Each said tube 70 is affixed to a bracket 72 which, in turn, is fastened to the upper surface of spindle rail 24 (see FIG. 4). Also, each tube 70 has a slot 74 extending the full length thereof, as best seen in FIG. 3 and an anvil 76 is fastened to the tube near the lower end thereof and adjacent one edge of slot 74. The slot 74 advantageously provides clearance for the entry and reciprocation of an arcuate arm 78 which is an extension from ring rail 22. Thus, as best seen in FIGS. 1–3 ring 40 is not affixed to ring rail 22 in the usual fashion, but, rather, is carried on the end of arm 78 remote from ring rail 22. Thus, as the ring rail 22 is reciprocated in its usual operative manner the ring 40 and its companion traveler 38 are caused to reciprocate axially of spindle 42 and core 46 within the confines of tube 70. It follows that the interior wall of tube 70 acts as a restrictor, limiting the size of the yarn balloon generated by the rotary action of traveler 38. Furthermore, it will be evident that the aerodynamic forces operating within the confined zone defined by the tube as a result of the motion of the yarn will, in fact, assist the movement of the yarn balloon around the spindle 42 and core 46.

It has already been indicated that the patrolling tender of the previously cited Bell and Niederer patent application may be utilized to advantage in connection with the spinning machine modified as contemplated herein to effect certain of the yarn spinning steps within the confines of tube 70. Thus, the patrolling tender includes, in addition to threading fork 54 and transporting mechanism 58, a pusher element 80 for opening or spreading slot 74 of tube 70 (in the embodiment of FIGS. 1–4) and a positioning bar 82 for aligning the threading fork for operation in registration with the ring 40.

Figure 4:
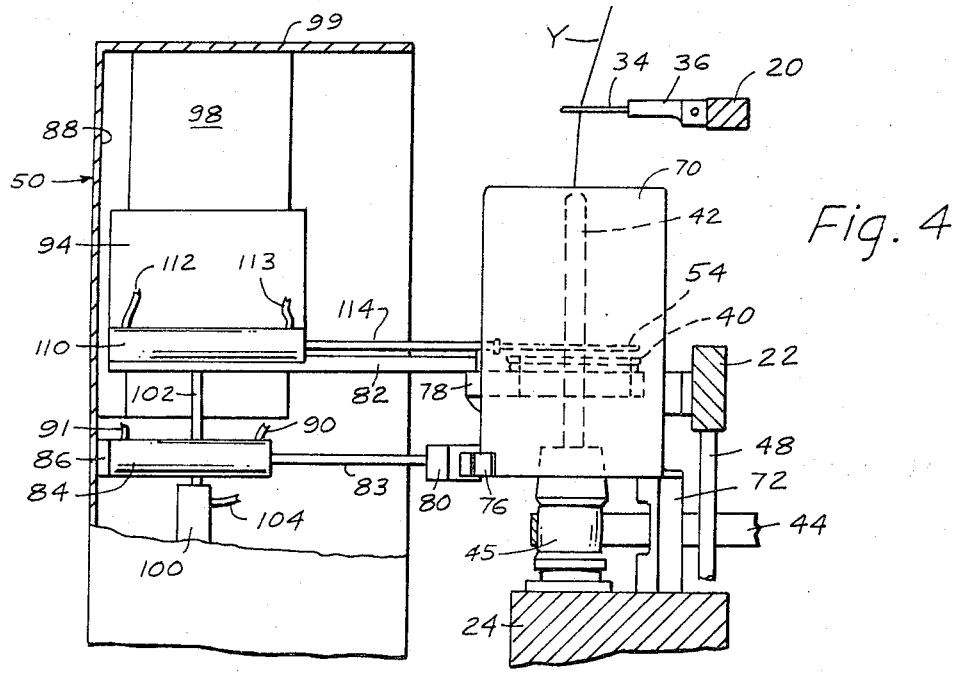
FIG. 4 is a view taken along lines 4—4 of FIG. 2.

Viewing FIGS. 2 and 4 it will be seen that the pusher element 80 is situated on the outer end of a piston rod 83. The inner end of said piston rod 83 received within a double-acting air cylinder 84 which is secured via a bracket 86 to the side of a wall 88 of tender 50. It will be understood that cylinder 84 is connected by air hoses 90, 91 to a compressed air source so that, on signal, the piston rod 83 may be advanced and retracted. As has already been explained for purposes of the embodiment now being described, tube 70 is formed from a resilient material such as spring steel. Hence, as the tender 50 is brought to a halt as explained in the prior cited patent application to service a spinning position and the pusher element is advanced from cylinder 84, it bears against anvil 76 and forces the side of the tube 70 fitted with the anvil to deflect outwardly from its normal position as a result of which slot 74 is expanded as best seen in the right hand spindle position in FIG. 3.

The purpose of expanding slot 74 as just explained is to provide for the entry of threader fork 54 so that said fork can operate as fully explained in the aforecited Bell and Niederer patent application to engage the yarn Y and arrange it for engagement by traveler 38. It will be appreciated that during normal operation of the spinning machine ring rail 22 and its associated mechanism is reciprocating vertically axially of spindle 42 and that at the time of yarn servicing it is necessary to align the threader fork 54 relative to ring 40 as discussed fully in the cited Bell and Niederer patent application and as generally shown in FIG. 4. To this end there is provided on tender 50 a slide 94 positioned for vertical movement on the guide ways 96 of a vertically oriented plate 98 (FIGS. 2 and 4) secured to both the side wall 88 and the top panel 99 of tender 50. A double-acting air cylinder 100 is fixed to the floor of tender 50 by brackets (not shown) and projects upwardly. A piston rod 102 extends upward from within cylinder 100 and is connected at its uppermost end to the lower wall of slide 94. Cylinder 100 is connected to a suitable source of compressed air (not shown) via air hoses 104 so that the cylinder can be operated to actuate slide 94.

With continuing references to FIGS. 2 and 4, it will be observed that slide 94 has a further double-acting air cylinder 110 affixed thereto in a generally horizontal position and situated slightly above the location of positioning bar 82 on said slide. Air hoses 112, 113 are connected between the cylinder 110 and a compressed air source (not shown) to operate a piston 114 having one end with said cylinder. The opposite end of piston 114 has threader fork 54 connected thereto. Thus, said fork 54 is movable in response to shifting of piston 114, the fork moving between a retracted position closely adjacent cylinder 110 to an extended, operative position situated slightly above ring 40 as best seen in FIG. 4.

As a first step in the yarn servicing operation, and after tender 50 has been located at a spinning position and after package P has been manipulated by bobbin transporting mechanism 58, air is introduced into cylinder 100 to withdraw rod 102 to contact ring holder arm 78, whereupon pusher element 80 bears against anvil 76 and forces the side of tube 70 carrying the anvil away from its companion side. As a result tube 70 is deflected and slot 74 is expanded sufficiently to admit threader fork 54 therethrough for arranging yarn Y for engagement by traveler 38.

The operation of threader fork 54 follows the expanding of slot 74 in tube 70 and involves the following steps. Upon signal compressed air is admitted into cylinder 100 to draw slide 94 downward from its raised rest or inactive position, the downward motion continuing until positioning bar 82 comes to rest on the top of arm 78 as best seen in FIG. 4. Since the force holding positioning bar 82 on arm 78 is less than the lifting force of traversing ring rail 22, the bar 82 and its mounting slide 93 together with cylinder 110 and the elements associated therewith follow the reciprocation of ring rail 22. During this period cylinder 110 is charged with air to thrust threader fork 54 forward to its active position above ring 40 as shown in FIG. 4 to thereby assist in threading the yarn through traveler 38. Once the traveler threading operation is completed threader fork 54 and pusher element 80 are retracted by operation of their respective cylinders and pistons, thereby permitting the tube to close around the package core for winding of yarn thereof. Thereafter, after other functions of the tender as recited in said Bell and Niederer patent application, cylinder 100 and its companion piston 102 operate on signal to elevate slide 94 to a raised, inactive position out of the zone of traverse of ring rail 22.

In the foregoing description it has been stated that signals are provided for initiating certain functions such as the operation of slide 94, threader fork 54 and pusher element 80. No attempt has been made to set forth the programming circuitry for signalling the actuation of the pneumatic and mechanical components herein since such controls are fully disclosed in the referenced Bell and Niederer patent application, it being well within the skill of those in the art to simply provide the modifications to the programming means described therein in order to furnish the several signals required for the instant invention.

Figure 5:
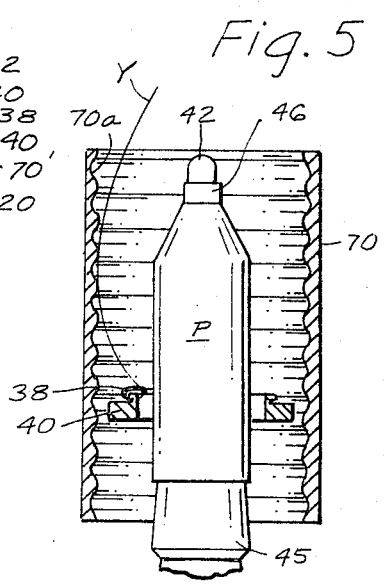
FIG. 5 is a view taken along lines 5—5 of FIG. 2 showing details of a preferred form of the package tube for use with the present invention.

At this juncture it is appropriate to direct attention to FIGS. 1 and 5 wherein details of a preferred form of the tube 70 are shown. While the present invention is operable when employing a tube of any internal configuration, it has been found particularly advantageous to have the internal wall 70a of the tube corrugated, as shown in FIG. 5, or otherwise interrupted from a plane surface to thereby preclude the yarn as it balloons within the tube from adhering to the internal tube wall. In FIG. 5 it is seen that the ribs or corrugations run essentially transversely of, i.e., at generally right angles to the path of yarn Y flowing from drafting unit 32 to core 46. Hence, the drag or frictional contact of the yarn with the interior of tube 70 is minimized. Also, it has been found beneficial to configure the tube 70 so as to be noncircular or involute in cross section as shown, for example in FIG. 2, thus providing an offset or "ski-jump" between the two opposing edges 70b and 70c of slot 74. That is, where the spindle 42 and yarn balloon are rotating in a clockwise sense as shown by the arrow in FIG. 2 the trailing edge 70c is desirably folded in slightly outward from the interior of the tube so that the yarn in the balloon will not catch and fray on said edge 70c; but, rather, will ride smoothly over said edge in its travel within tube 70.

MODIFICATIONS

Modified tube

It will be appreciated by those skilled in the art that tube 70 may have a variety of shapes and may be supported in a variety of different ways from that already described. For instance, it would be possible to split tube 70 into two semi-circular sections and hinge the sections together. With such arrangement the sections could be spring-biased into a closed, operative position around spindle 42 and would be readily responsive to operation of pusher element 82 to spread the two tube sections from admittance of the threader fork as previously described. However, no attempt will be made to illustrate and describe all the possible variations along this line as most of them will be obvious to those skilled in the art.

Figure 6:
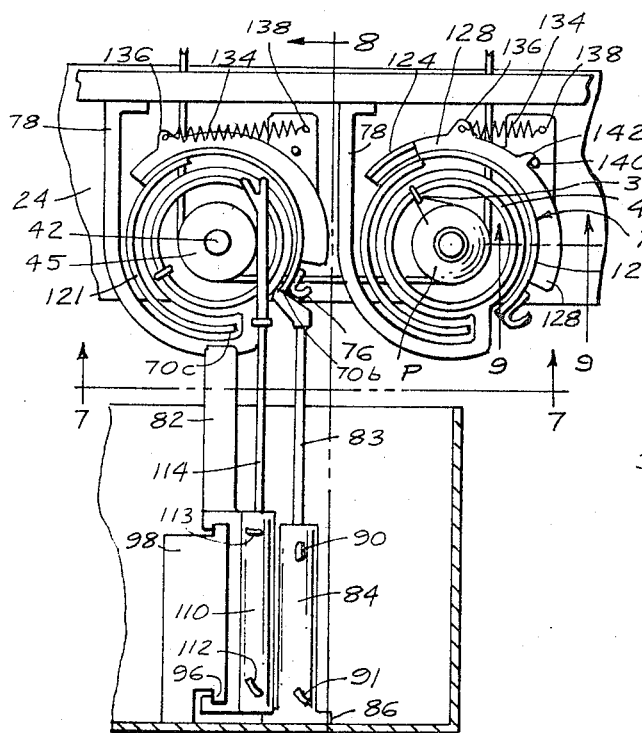
FIG. 6 is a plan view showing a modified form of package tube for use with the instant invention.

In FIGS. 6–9 there is illustrated a modified form of the tube 70 which is of more than usual interest. Viewing FIG. 6 it will be seen that tube 70′ is constituted as two individual generally semi-circular sections 120, 121. The support for the tube sections 120, 121 is provided by a generally semi-circular fixed plate 124 having a dovetail groove 126 therein and a slidable plate 128 having a mating dovetail portion 130 fitted into groove 126 (see FIG. 9). The fixed plate 124 is supported on a standard 132 affixed to spindle rail 24, as seen in FIGS. 7 and 8. The tube section 121 is fastened to a portion of fixed plate 124 as is thus held stationary. The tube section 120, on the other hand, is mounted on slidable plate 128. As seen in FIG. 6, the slidable plate 128 is normally biased clockwise by a spring 134 connected between an ear 136 on said slidable plate and a pin 138 embedded in the top of standard 132. In this clockwise biased position tube 70′ is in its operative position generally surrounding package P and spindle 42. A stud 140 fixed in the top of standard 132 is cooperable with a tab 142 extending radially from the outer edge of slidable plate 128 to stop the closure of tube section 120 in a position to preserve the clearance slot 74 through which arm 78 extends in the manner earlier described.

In the embodiment of FIGS. 6–9, when tender 50 halts in register with a spinning position to service the yarn thereat as previously described and as pusher element 80 is operated as set forth earlier it contacts anvil 76 thereby sliding tube section 120 counterclockwise as seen in FIG.

6. This expands the slot 74 to afford clearance for entry of the threader fork for engaging the yarn. Upon withdrawal of the pusher element 80 is withdrawn, spring 134 acts to slide tube section 120 clockwise to its closed position with tab 142 bearing on stud 140.

Modified ring and traveler arrangement

In FIGS. 10–13 there is illustrated a modified form of ring and traveler arrangement for use with the present invention. In this modification exposure of the ring 40 and traveler 38 for threading is achieved by moving these elements out of the effective zone of tube 70. Thus, initially viewing FIGS. 10 and 11, each spinning position of the spinning machine is seen to include the usual ring 40, traveler 38 and spindle 42 for supporting core 46 and package P all as previously described. Further, the usual traverse rail 22 and spindle driving belt 44, both of which are common to all spindles along at least one side of the spinning machine are provided. Each spindle 42 is generally surrounded by an elongated tube 70 supported on bracket 72 as previously described. In the modification of FIGS. 10–13 the structure for supporting each ring 40 and traveler 38 includes a bracket 150 which is firmly attached at one of its ends to ring rail 22. The opposite end of bracket 150 is connected to a reciprocating operating bar 152 which depends from said bracket 150 and passes through a guide aperture 154 in spindle rail 24. Said operating bar 152 is thus arranged to reciprocate in response to and in synchronism with traversing ring rail 22.

Figure 12:
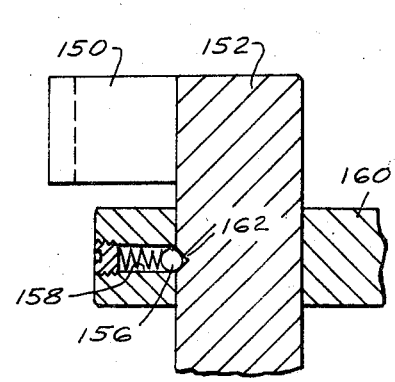
FIG. 12 is a view taken along lines 12—12 of FIG. 10.
Figure 13:
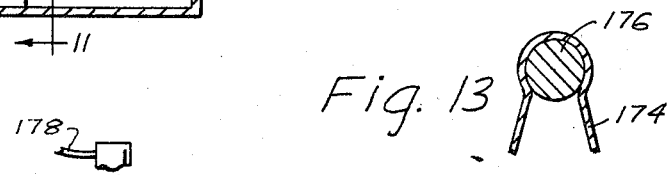
FIG. 13 is a view taken along lines 13—13 of FIG. 10.

With particular attention to FIG. 12 it will be seen that ring 40 is connected to operating bar 152 by detent means constituted as a spring-loaded ball 156 seated in a bore 158 in the outer end of the support arm 160 of said ring. The ball 156 is engageable in a V-notch 162 formed in the upper region of operating bar 152. Thus, in normal operation ring rail 22 is reciprocated. In consequence, operating bar 152 is similarly reciprocated to move ring 40 and traveler 38 to and from axially of spindle 42 and core 46 to thereby wind yarn along said core.

Figure 10:
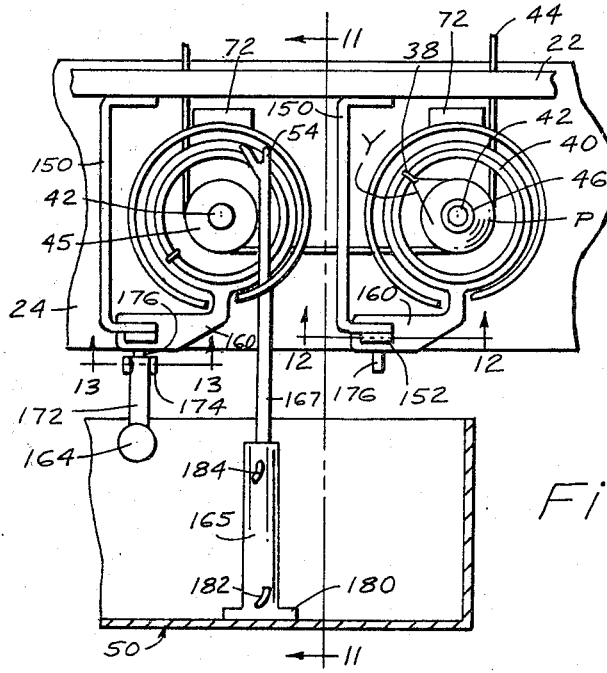
FIG. 10 is a plan view of a modified form of ring and traveler means for use with the present invention.
Figure 11:
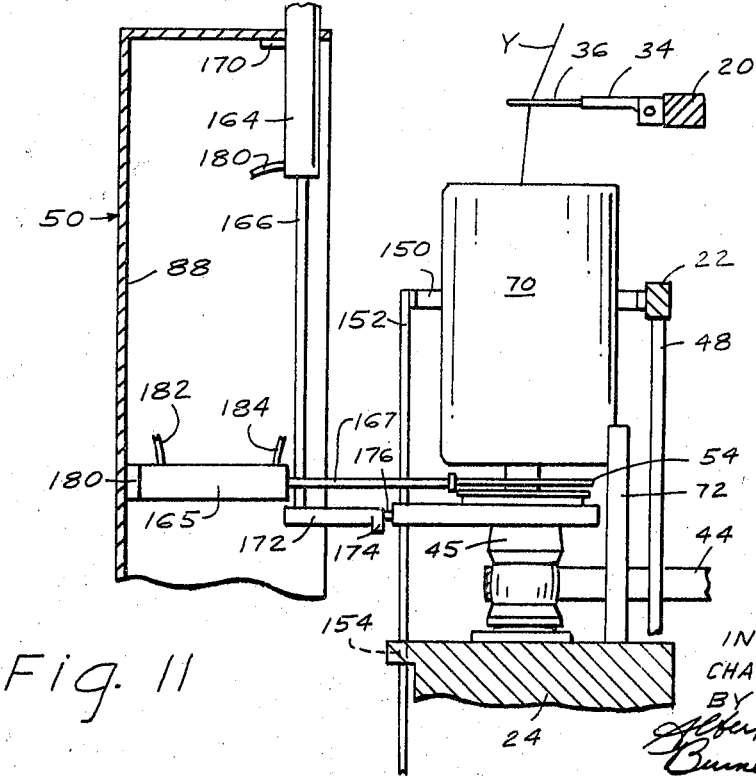
FIG. 11 is a view taken along lines 11—11 of FIG. 10.

In the modification of FIGS. 10–13 tender 50 is provided with a pair of air cylinders 164, 165 having respective piston rods 166, 167 operative therewith. Cylinder 164 is secured in a depending position from the interior wall of the top panel 99 of tender 50 by a bracket 170 so that its piston rod 166 projects downward. The lower end of piston rod 166 is fitted with a short horizontal arm 172 the outer end of which carries a spring clip 174. Said clip 174 is aligned to engage and yieldably seize a stud 176 projecting theretoward from the side of arm 160, as illustrated in detail in FIG. 13. By virtue of this arrangement of parts ring 40 can be detached from its operating bar 152 as a step in the over-all servicing of a spinning position by tender 50. As the tender 50 comes to rest in register with the position to be serviced compressed air from a source not shown is introduced through line 178 to drive piston rod 166 down. As a result, clip 174 seizes stud 176, causing ball 156 to disengage from V-notch 162 and carrying the ring down to a threading up position below the lower margin of tube 70 as shown in FIG. 11. In sequence and after the traveler 38 has been threaded in accordance with the procedure set forth in the cited Bell and Niederer patent application the air pressure biasing piston rod 166 downward is relieved and compressed air is introduced into cylinder 164 via line 180 to draw piston rod 166 upward. In the course of the upward stroke of piston rod 166 ball 156 engages in V-notch 162 and spring clip 176 snaps off stud 176. Hence, the ring is once again joined with its ring rail 22 and operating bar 152 for reciprocation and spring clip 176 comes to rest above the reciprocating path of arm 160, thereby precluding interference of the clip with arm 160 and stud 176 during normal yarn spinning and twisting.

In the modification presently under discussion it is possible to situate the cylinder 165 in a fixed position in a plane for threading up traveler 38. Thus, as illustrated in FIGS. 10 and 11 cylinder 165 is fastened to the interior rear wall 88 of tender 50 by a bracket 180. Its piston rod 167 carries the threader fork 54 on the outer end thereof. Consequently, on signal and after ring 40 has been lowered to its threading position as previously described compressed air is introduced into cylinder through hose 182 to extend threader fork 54 over ring 40 as shown in FIG. 11 to cooperate in threading traveler 38. Once this operation is completed and on signal the air through line 178 is shut off and compressed air is then fed through air hose 184 to retract piston rod 167 and threader fork to their inoperative positions outside the traversing path of ring 40. The signalling means for achieving the several functions set forth herein have not been detailed herein. Rather, reference is once again made to the programming system fully disclosed in said Bell and Niederer patent application where programming circuitry for signalling actuation of the components as herein set forth are disclosed, it being well within the skill of those in the art to modify said programming means to furnish the signals herein required.

Modified tube operation

In FIGS. 14 and 15 there is illustrated a modified form of the invention wherein the tube 70 is operated in conjunction with doffing of the package P, this package doffing being itself a normal step in the sequence of operations as taught in the previously mentioned Bell and Niederer patent application. In this embodiment and with reference to FIGS. 14 and 15 there are provided on tender 50 the various components for aligning threader fork 54 with ring 40 as previously described in the embodiments of FIGS. 1–8 and rather than repeat those details herein again, reference is made to the earlier description for the details thereof.

With attention to FIGS. 14 and 15 the modified bobbin transporting mechanism is shown generally at 58′ and includes a vertically oriented air cylinder 190 and associated hoses 191, 192 for admitting pressurized air to the cylinder. The cylinder is supported on a bracket 194 mounted on a post 196 affixed to the frame of tender 50. Cylinder 190 is provided with the usual slidable piston 198, one end of said piston being received within the cylinder and the opposite end depending therefrom. A bobbin gripper assembly is attached to the lower end of piston 198 and includes a flange 200 arranged to support a pair of concentric, inflatable rings 202, 204. Each said ring is provided with a respective air conduit 206, 208 for admitting compressed air to the rings to expand them. As seen in FIG. 15 ring 202 is positioned along generally the outer edge of flange 200 in a position to slide freely over the outer, upper end of tube 70 as flange 200 is lowered by piston 198. In this embodiment tube 70 is preferably formed from a rather rigid material such as a stiff plastic simply so it will not deflect excessively when seized by ring 202. Thus, when said ring 202 is inflated it firmly grips tube 70 in order that the tube may be elevated off a concentric bracket 210 which serves as a seat for holding the tube in its normal operative position surrounding spindle 46. The inner ring 204 is situated on flange 200 in a position to slide freely over the top of package core 46 coincident with the lowering of flange 200. As ring 204 is inflated it grips the core and acts to lift core 46 off spindle 42 in response to the elevation of piston 198.

In operation of the embodiment just described the actuation of the bobbin transporting mechanism 58′ to seize core 46 is effected in the same manner as set forth for the bobbin transporting mechanism described fully in the cited Bell and Niederer patent application. As flange 200 is lowered to seat the inflatable rings 202 and 204 around tube 70 and core 46 respectively, valve means are energized on signal to admit air to both rings 202, 204. With tube 70 and core 46 securely held, piston 198 working within cylinder 190 is raised to carry the tube and core upwardly as seen in FIG. 15 to thereby expose traveler 38 for threading in conjunction with the cooperative movement of threader fork 54. Obviously, it is within the scope of the invention to release on signal tube 70 temporarily by simply deflating ring 202 in order that the yarn end on package P may be located or so that package P could be released from ring 204 and a fresh core clamped by said ring 204. In said Bell and Niederer application mechanism is fully disclosed for moving package P to a discharge point on bobbin transporting mechanism 58' whereby the package may be discharged and a fresh core picked up by the transporting mechanism for donning on spindle 42. The signal means for the several functions recited herein are contemplated as modifications of the programming means of the cited U.S. patent application also, and since such modifications are well within the skill of the art, these signalling means have not been detailed herein.

Accordingly, from the foregoing it will be understood that the foregoing invention provides unique and advantageous method and apparatus for spinning yarn and winding up the twisted yarn within the confines of a restricted zone. The invention is operable in conjunction with a spinning frame employing a patrolling tender operable to automatically service each spinning position along the spinning frame.

Since certain changes may be made in the above invention without departing from the scope of the invention herein involved it is intended that the foregoing shall be interpreted as illustrative only and not in a limiting sense.

What is claimed is:

1. Apparatus for processing yarn comprising, a yarn supply source, rotatable yarn take-up means for collecting the yarn flowing from said source, a ring positioned circumferentially around said take-up means, a traveler revolvable on said ring and arranged to guide the yarn to said take-up means for winding thereto, traversing means for reciprocating said ring and traveler in a zone longitudinally of said take-up means to distribute the yarn therealong, and an arcuate restricting member extending substantially the full length of said zone to restrict the path of the yarn being guided by said traveler.

2. Apparatus as set forth in claim 1 wherein said restricting member is a tube substantially encircling said zone.

3. Apparatus as set forth in claim 2 wherein the internal surface of said tube is interrupted.

4. Apparatus as set forth in claim 2 including mounting means for supporting said ring, a first end of said mounting means being connected to said traversing means, and a second end of said mounting means being attached to said ring within said tube, the tube having a longitudinal slot therein for passage of said mounting means.

5. Apparatus as set forth in claim 4 wherein said tube is formed of resilient material, and including means for expanding said slot to afford access for threading said traveler.

6. Apparatus as set forth in claim 4 wherein said tube includes a fixed section and a slidable section, and including means for moving said slidable section relative to said fixed section to expand said slot to afford access for threading said traveler.

7. Apparatus as set forth in claim 4 including detent means for connecting said ring to said mounting means and including means for operating said detent means to release said ring from said mounting means and move said ring to a position for threading of yarn in said traveler.

8. Apparatus as set forth in claim 4 wherein said tube is involuted to thereby offset the relative positions of the opposing walls of said slot.

9. Apparatus as set forth in claim 4 including a seat for supporting said tube, and means for removing said tube from said seat to afford access for threading said traveler.

10. In combination with a textile machine having at least one station thereon adapted to advance yarn therealong and having a tender provided with yarn manipulating means for servicing the yarn at said station; the improvement therein comprising, rotatable yarn take-up means at station for collecting the yarn being advanced thereto, means for traversing the yarn in a zone longitudinally of said take-up means to distribute the yarn therealong, a restricting member positioned proximate to said zone for restricting the path of the yarn advancing to said take-up means, and control means on said tender for operating said restricting means to afford access for said yarn manipulating means to said take-up means.

11. Apparatus as set forth in claim 10 wherein said restricting member is a tube substantially encircling said zone.

12. Apparatus as set forth in claim 11 wherein the internal surface of said tube is interrupted.

13. Apparatus as set forth in claim 11 wherein said tube has a longitudinal slot therein.

14. Apparatus as set forth in claim 13 wherein said tube is formed of resilient material, and said control means includes a pusher member for deflecting said tube to expand said slot to afford access for said yarn manipulating means.

15. Apparatus as set forth in claim 13 wherein said tube includes a fixed section and a slidable section, and said control means includes a pusher member for moving said slidable section relative to said fixed section to expand said slot to afford access for said yarn manipulating means.

16. Apparatus as set forth in claim 13 including ring and traveler means for guiding the yarn to said take-up means, mounting means for supporting said ring and traveler means within the confines of said tube, detent means connecting said ring to said mounting means, and means for operating said detent means to release said ring from said mounting means and move said ring to a position for threading of yarn in said traveler.

17. Apparatus as set forth in claim 13 wherein said tube is involuted to thereby offset the relative positions of the opposing walls of said slot.

18. Apparatus as set forth in claim 13 including a seat for supporting said tube, and means for removing said tube from said seat to afford access for said yarn manipulating means.

19. Apparatus as set forth in claim 18 wherein said means for removing said tube includes means operable to seize a yarn core of said take-up means to thereby effect simultaneous removal of said tube and core.

20. In combination with a textile machine having a plurality of stations thereon each of which is adapted to advance yarn therealong and having a patrolling tender provided with bobbin transporting means and yarn manipulating means for servicing the yarn at each station; the improvement therein comprising, rotatable yarn take-up means including a core at each station for collecting the yarn advancing thereto, traversing means, guide means responsive to said traversing means for movement in a zone to distribute the yarn axially of each said core, a tubular member substantially encircling each said zone for restricting the path of movement of said yarn, each said tube having an open upper end for removal of said core therefrom by said bobbin transporting mechanism, and control means on said tender for operating said restricting means at each station to be serviced to thereby afford access for said yarn manipulating means to direct yarn to said guide means for threading therein.

21. Apparatus as set forth in claim 20 wherein said tubular member has a longitudinal slot therein, said control means being operable to expand said slot to afford access for said yarn manipulating means.

22. Apparatus as set forth in claim 21 wherein said guide means includes a ring and associated traveler operable within the confines of said tubular member, and said yarn manipulating means includes a fork for positioning said yarn for engagement by said traveler.

23. Apparatus as set forth in claim 22 including means arranging said fork for traversing movement synchronously with said ring and traveler during threading thereof.

24. Apparatus as set forth in claim 22 wherein said tubular member is formed of resilient material, and said control means includes a pusher member for deflecting said tubular member to expand said slot to afford access for said fork.

25. Apparatus as set forth in claim 22 wherein said tubular member includes a fixed section and a movable section, and said control means includes a pusher member for moving said slidable section relative to said fixed section to expand said slot to afford access for said fork.

26. Apparatus as set forth in claim 22 including mounting means for supporting said ring and traveler, detent means connecting said ring to said mounting means, and means for operating said detent means to release said ring from said mounting means and move said ring to a position for access to said fork.

27. Apparatus as set forth in claim 22 wherein said tubular member is involuted to thereby offset the relative positions of the opposing walls of said slot.

28. Apparatus as set forth in claim 22 including a seat for supporting said tubular member, and said bobbin transporting means being operable to remove said tubular member from said seat to afford access to said traveler by said fork.

29. Apparatus as set forth in claim 28 wherein said bobbin transporting means includes means operable to seize said core to thereby effect simultaneous removal of said core and tube.

30. Apparatus as set forth in claim 29 wherein said bobbin transporting means includes inflatable rings for engaging said core and tube.

31. A yarn control member for use with a textile machine having a rotatable spindle, a ring encircling said spindle, and a traveler engageable with the yarn advancing to said spindle and revolvable on said ring to guide the yarn to said spindle while generating a balloon around said spindle traversing means for moving said ring and traveler in a zone axially of said spindle, and mounting means connecting said ring to said traversing means comprising, an elongated tube extending generally the length of said zone and having an inner wall positioned proximate to said ring and traveler for restricting said balloon, and a longitudinal slot formed in said tube for passage of said mounting means.

32. The combination as set forth in claim 31 wherein said inner wall is interrupted from a plane surface.

33. The combination as set forth in claim 31 wherein said inner wall as a plurality of ribs extending generally transversely of the path of advance of the yarn to said spindle.

34. The combination as set forth in claim 31 wherein said tube is involuted in cross section to thereby offset the relative positions of the opposing walls of said slot.

35. The combination as set forth in claim 31 wherein said tube is formed of a flexible material.

36. The combination as set forth in claim 31 wherein said tube includes a fixed section and a slidable section, said slidable section being movable between an open and a closed position, and spring means for biasing said tube to said closed position.

References Cited

UNITED STATES PATENTS

| 539,561 | 5/1895 | Whitaker | 57—108 |
| 1,864,020 | 6/1932 | Ingham | 57—108 XR |
| 2,745,239 | 5/1956 | Kingsbury | 57—108 |
| 3,065,592 | 11/1962 | Kresslein | 57—108 |
| 3,077,726 | 2/1963 | Lenk | 57—106 XR |
| 3,086,350 | 4/1963 | Keyser | 57—108 |
| 3,299,624 | 1/1967 | Nimtz | 57—108 |
| 3,327,465 | 6/1967 | Nimtz | 57—108 |

FOREIGN PATENTS 958,189   5/1964   Great Britain.

DONALD E. WATKINS, *Primary Examiner.*

U.S. Cl. X.R.

57—34, 121